United States Patent [19]

Antonelli

[11] Patent Number: 5,074,387
[45] Date of Patent: Dec. 24, 1991

[54] COMBINED DRUM AND DISK BRAKE SYSTEM

[76] Inventor: Carl Antonelli, 92 Erie St., Providence, R.I. 02908

[21] Appl. No.: 495,949

[22] Filed: Mar. 20, 1990

[51] Int. Cl.⁵ ............................................. F16D 63/00
[52] U.S. Cl. .................................................. 188/70 B
[58] Field of Search ................ 188/70 R, 70 B; 303/2

[56] References Cited

U.S. PATENT DOCUMENTS

| | | | |
|---|---|---|---|
| 2,352,222 | 6/1944 | Pogue et al. | 188/70 R |
| 2,968,367 | 1/1961 | Burnett | 188/70 B |
| 3,088,551 | 5/1963 | Burnett | 188/70 B |
| 3,139,955 | 7/1964 | Dombeck | 188/70 B |

FOREIGN PATENT DOCUMENTS

| | | | |
|---|---|---|---|
| 205391 | 5/1956 | Australia | 188/70 R |
| 1235160 | 2/1967 | Fed. Rep. of Germany | 188/70 R |
| 188702 | 4/1964 | Sweden | 188/70 R |
| 977318 | 12/1964 | United Kingdom | 188/70 R |

Primary Examiner—Matthew C. Graham

[57] ABSTRACT

By combining the braking actions of a drum brake system with and a disc brake system in each wheel that is used for braking of a motor vehicle or trailer, so that the braking actions are at some angle to each other, the over-all braking effect and efficiency are significantly improved.

1 Claim, 2 Drawing Sheets

COMBINED DRUM AND DISK BRAKE SYSTEM

BACKGROUND OF THE INVENTION

1. Field Of The Invention

This invention in general relates to brakes and in particular combined drum and disk brakes in one wheel.

2. Prior Art

In common motor vehicle brake systems, applying a foot brake action causes an hydraulic pressure in a master cylinder. The pressure is transmitted to all wheels that contain either drum or disc brakes.

Front wheel brakes are usually of the disc type with static calipers, while rear wheel brakes are typically of the drum type.

Typical drum brake systems use left and right brake shoes which are lined with friction pads. Both drum and disc brake systems operate by applying hydraulic pressure to pistons which force stationary friction producing members into contact with rotating friction producing members.

In a disc type braking system, when a sufficient amount of pressurized brake fluid is supplied to a wheel brake cylinder, calipers will pinch the rotating disc between the friction pads thus causing a frictional braking action.

Drum brakes are usually of the duo servo type having an hydraulic wheel cylinder with two pistons acting in opposition. Hydraulic brake fluid in said cylinder under pressure from a master cylinder will drive pistons in the wheel cylinder to drive shafts that will drive the ribs of the drum brake shoes radially outward to the peripheral drum surface which will engage the drum brake shoe friction pads and produce frictional vector forces and a desired braking effect.

Biased springs appropriately placed, keep the friction pads away from the friction surfaces when the foot brake is not activated.

By certain laws of physics, the amount of friction force that develops between two surfaces in relative motion and rubbing each other, depends upon the coefficient of friction and the normal(perpendicular) force holding them together. The contact area is not a factor that will proportionately increase or decrease the friction force.

Hence, in either a drum brake system or a disc brake system in separate wheels, increasing the area of the friction pads will not make the vehicle stop faster if the amount of applied brake pressure developed and used when the foot brake pedal is asserted is the same as for larger brake pads; the only advantage gained will be longer lasting brake pads.

Therefore it would be difficult to increase the brake pad efficiency or power efficiency as economically on a drum brake or disc brake system when each is in a separate wheel.

A search for combined brake systems was made but none could be found. Burnett et al U.S. Pat. No. 3,899,052 was examined but it was clearly a disc brake device. Cochran et al U.S. Pat. No. 3,838,755 was also clearly a disk braking mechanism. U.S. Pat. No. 4,450,947 was titled "Combination Friction Ring and mount therefor..." but the word "Combination" does not connotate a combining of drum and disk brakes in one wheel.

These were viewed to see if any evidence of combined drum and brake systems was there. Many other patents under the Brakes classification were studied but generally they were distinctly of the disc, drum, or conical variety.

None had the advantages of this invention which will be described clearly subsequently in this application for patent.

SUMMARY OF THE INVENTION

The primary object of this invention is to provide a combination drum and disc brake device in each wheel of a motor vehicle or trailer for extra braking power, braking efficiency, and economy not evident in prior art.

It comprises a combined peripheral friction surface and an annular friction surface to which respective friction brake pads of suitable friction material are pressed with a normal(perpendicular) force to obtain a braking action. The surfaces are aligned at some appropriate angle to each other and are not in the same plane and the said pads and said friction surfaces are in relative motion.

When the two prior art braking systems are brought together in one brake drum or one brake disk the resulting braking action is synergistic because there is a significant braking power gain over prior art where each of the said braking surfaces are utilized in separate wheels. In this invention the added advantages are due to the fact that the applied forces are in diffferent directions and the braking effects are algebraically additive. With the appropriate means applied to develop the said forces, mechanical advantages can be economically gained to produce a measurable power advantage.

A prior art drum brake or a prior art disc brake can be readily converted to the combined drum and brake system presented in this invention.

The brake drum of a prior brake drum system can be modified or manufactured so that its annular rough surface is sufficiently machined to be an effective annular friction surface. The modified drum can then be used as an essential portion of this invention. The disc of a common disk brake can be modified or manufactured so its annular peripheral surface can be prepared to serve as an essential portion of this invention also. The subsequent detailed description will explain some methods of conversion.

Another objective of this invention is that it can be applied to common ermergency brake systems which usually use a steel cable that is put under tension by a hand or a foot lever. The cable then pulls on the brake shoes which are mechanically driven to a peripheral friction surface in the case of drum brake systems. The tighter the the cable, the greater the force that pulls on the brake shoes and so the the emergency braking effect becomes proportionately greater.

If the annular surface of the brake drum is suitably prepared, and a means of pressing an annular friction pad against said annular surface is provided, in effect an embodiment of this invention is produced to create a powerful emergency brake system with an added measure of power and safety. As a means of producing the needed force to deliver to the annular friction pad against the said annular friction surface, an electrical solenoid with a suitable drive shaft can be interlocked with a switch that can turn on the power to the solenoid when the emergency brake lever or pedal is asserted. The holding annular friction force is algebraically additive to the the peripheral holding friction force produced by the prior art common drum brake which does not have to be disturbed except to prepare the annular surface.

In summary, some limitations of prior art can be overcome without adding additional pressure at the foot brake pedal or increasing the tension of emergency brake cable, which means that this invention is a power booster braking device easily accomplished.

BRIEF DESCRIPTION OF DRAWINGS

In the drawings, like reference symbols indicate the same parts throughout the various views of a system, a specific embodiment of the invention or modification thereto.

DESCRIPTIONS OF THE PREFERRED EMBODIMENTS

Figure 1:
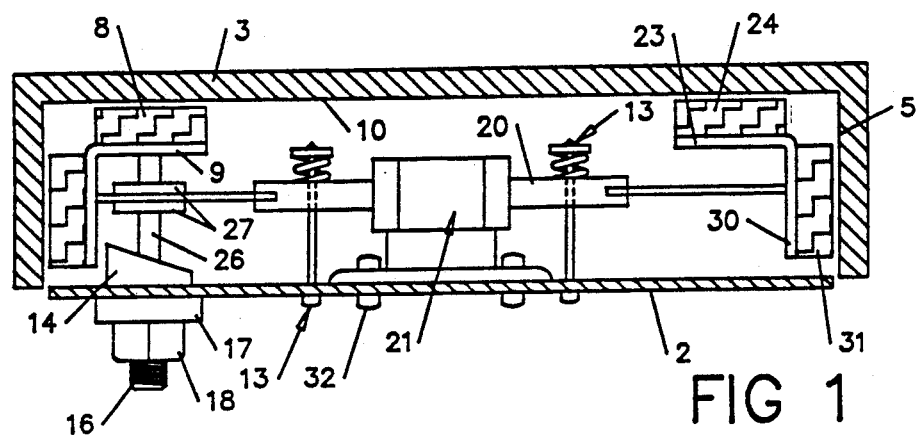
FIG. 1 illustrates a cross sectional view A-A derived from FIG. 2 to show a preferred embodiment of this invention.(For simplicity FIG. 1 does not include the upper constraining spring)
Figure 2:
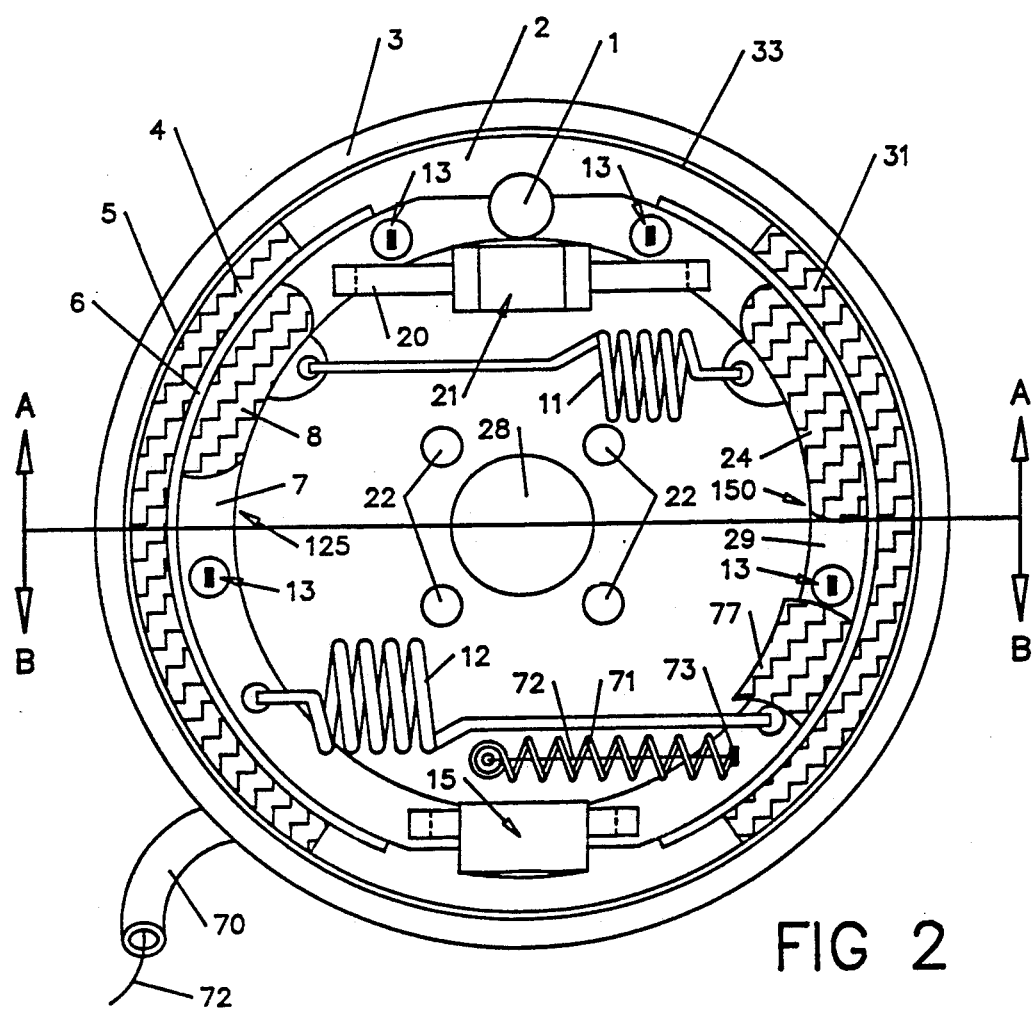
FIG. 2 illustrates another view of this invention.(For clarity this figure is drawn as if the annular face of the brake drum were cut away)

Refer now to FIG. 1 which is an overall drawing of a preferred embodiment of this invention. FIG. 2 has been presented to better describe three preferred embodiments of this invention.

This invention requires combined annular and peripheral friction surfaces aligned at an angle to each other, in different planes that are not parallel to each other. In FIG. 1, on a physical medium as a single unit, a single brake drum 3 as a medium to contain a combined annular friction surface 10 and a peripheral friction surface 5, aligned at an angle to each other, preferrably approximately 90 degrees, rotate with a common axle or about a common axis to control the motion of a motor vehicle or trailer. It can be stated that the two said friction surfaces in drum 3 rotate about a common axis when the axle is fixed and said drum 3 rotates about it freely. Essentially, FIG. 1 shows a preferred embodiment comprising the said brake drum 3 with an annular friction surface 10 and a peripheral friction surface 5; a peripheral friction plate 30; an annular friction plate 23; a peripheral friction plate pad 31 bonded to said peripheral friction plate; an annular friction plate pad 24 bonded to said annular friction plate; and a sloped wedge 14. Wall 2 of a motor vehicle or trailer is commonly used for typical prior art drum brake systems. Typical disc brake systems however do not require this wall 2. Said wall is affixed to the motor vehicle wheel axle housing which is not shown in the drawings for the sake of clarity and because it is well known to those familiar with braking systems on motor vehicles with drum brake systems.

Brake drum 3 is driven by an axle that holds the brake drum 3 with threaded stud bolts that are passed through a plurality of stud holes 22. The drum is held tightly to the axle concentrically with the wheel and tire by threaded stud nuts. This arrangement is quite familiar to nearly all motor vehicle drivers and is used for the preferred embodiment of this invention.

For this invention the inner peripheral friction surface 5 and the inner annular surface 10 are machined to provide appropriate friction surfaces to produce a braking effect when respective brake pads are pressed against them to control the motion of a motor vehicle or trailer.

When the said brake drums are manufactured, the said surfaces maybe of an adequate texture to perform as friction surfaces for this invention. The adequacy of texture is a matter of opinion. The action of pads against said surfaces however does usually wear them down unevenly and then machining is required to restore them. As an option to a machined surface, a replaceable insert insert 33 can be used to provide the inner peripheral friction surface 5 and inner annular friction surface 10.

However, the preferred embodiments of this invention would use a typical brake drum 3 machined to have suitably textured peripheral friction surface 10 and annular friction surface 5.

The drum 3 is driven at various angular velocities, either clockwise or counter clockwise. Said surface 5 and surface 10 are at right angles to each other; in that relationship their respective brake effects are additive. The angle, however, does not have to be exactly 90 degrees. For the preferred embodiments of this invention as per FIG. 1 and FIG. 2 a pair of typical drum brake shoes is used. The left brake shoe 125 is a means to drive the annular friction plate 9 and the peripheral friction plate 6 toward the annular friction surface 10 and the peripheral friction surface 5 respectively. Said left brake shoe comprising a peripheral friction plate 6, a peripheral friction plate pad 4 bonded to said peripheral plate 6, a shoe rib 7 to which a sliced threaded bolt 26 is fixed to said rib 7 with two locking nuts 27 so that said bolt 26 having a slope to match the slope of said sloped wedge 14 will function smoothly when the said sliced bolt 26 is made to pass over the said wedge 14, an annular friction plate 9, and an annular friction plate pad 8 bonded to said annular friction plate 9.

The right brake shoe 150 as a means to drive the peripheral friction plate 30 toward the peripheral friction surface 5 comprising a peripheral friction plate 30, a peripheral friction plate pad 31 bonded to said plate 30, an annular friction plate 23, an annular friction plate pad 24, and a right brake shoe rib 29.

Two slotted shafts 20 synchronously drive the left and right brake shoes toward the inner peripheral friction surface 5 to produce the peripheral braking effect. Double acting hydraulic cylinder 21, of a type found in most motor vehicles using typical drum brakes can be used for this embodiment as a means to drive the said annular friction plate and said peripheral friction plate toward the said annular friction surface and said peripheral friction surface. There are several means of affixing cylinder 21; one means of affixing said cylinder 21 to wall 2 may consist of a plurality of rivets 32 or a plurality of bolts and nuts can serve as well. Cylinder 21, connected to a slotted drive shaft at each end, is pressurized by fluid delivered by a hydraulic line from a master hydraulic cylinder when the vehicle foot brake pedal is activated to brake and control the motion of the moving vehicle. When cylinder 21 is pressurized it drives the slotted shafts 20 which are fitted into notches cut into the ribs of the brake shoes. When the foot brake pedal is deactivated, both the left and right brake shoes are pulled away from the inner peripheral friction surface 5 by an upper brake shoe constraining spring 11 and lower constraing spring 12. For the sake of clarity spring 11 is not shown in FIG. 1. The return of the brake shoes is limited by a stopper 1 at the upper end, and by the brake shoe adjustment device 15 at the bottom. A plurality of a spring device 13 is used to keep said annular friction pad 8 away from said annular friction surface 10 when the hydraulic pressure in said cylinder 21 is relieved.

If there were no means of driving said annular plate pad 8 or said annular pad 24 toward annular friction surface 10, this invention would not be workable and the brake device would be a common drum brake type. This invention becomes a combination drum and disc brake in FIGS. 1 and 2, when it comprises a said wall 2 to support said sloped wedge 14 which has a contiguous bolt 16 that passes through said wall 2 with a lock washer and a lock nut to hold said wedge firmly, as said sliced bolt is made to drive the said left shoe rib 7 and said annular friction plate 9 and pad 8 to rub the said annular friction surface 10 to produce a braking effect. To interact with said wedge 14 a sliced threaded bolt 26 with slope to match that of the said wedge 14, is affixed and adjusted to the left brake shoe 125, rib 7, with a pair of lock nuts 27.

When hydraulic cylender 21 is pressurized it drives the two slotted shafts which synchronously drive brake shoe rib 7 and brake shoe rib 29. As shoe rib 7 moves it carries sliced bolt 26 to move along the slope of wedge 14, and this causes the annular pad 8 to engage annular friction surface 10 and peripheral friction pad 4 to engage peripheral friction surface 5. If the wedge slope is cut at 30 degrees with the horizontal, the ratio of forces is 1.732 to 1 in favor of the peripheral rib 7 which will be driven harder then the sliced bolt 26. This means that by adding and activating friction pad 8 the braking affect of this invention is about 37% greater than that of a common drum brake system. Because of the alignment of the friction surface 5 and friction surface 10 which are set at right angles to each other, their braking effects are algebraically additive. Because of the further mechanical advantage produced by the wedge 14, the additional braking affect of this invention is a significant and adequate improvement over an ordinary common brake drum system. Any additional power may cause over sensitivity at the foot brake pedal and could cause unwanted wheel lock-up. However, if additional power is desireable, the wedge 14 and sliced bolt 26 means could be employed with the right brake shoe also.

Figure 3:
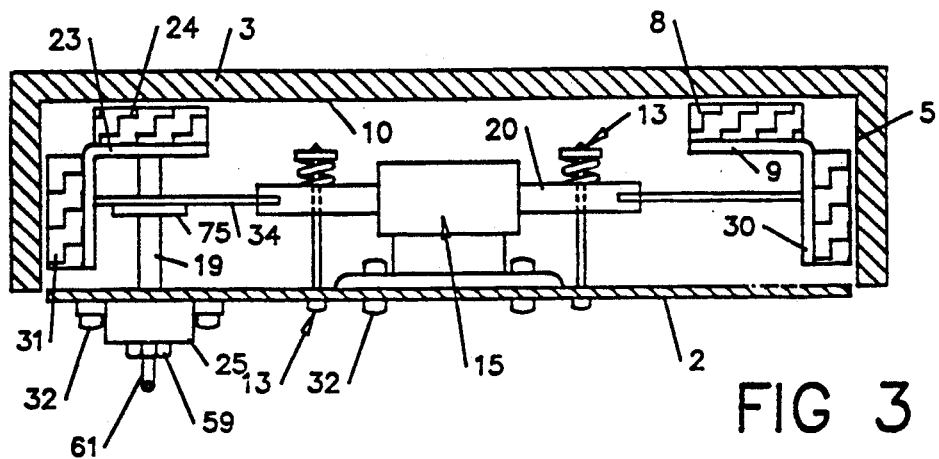
FIG. 3 illustrates another embodiment of this invention.

Referring to FIGS. 2 and 3, an alternate embodiment of this invention would require the right brake shoe comprising annular friction pad 24, annular friction plate 23, peripheral friction plate 30, peripheral plate pad 31 bonded to plate 30; a friction plate pad bonded to each said friction plate is required; a rib with a slot 34 to allow passage of a drive shaft 19; said drive shaft 19 is fitted between said annular friction plate 23 and single acting hydraulic cylinder 58 to drive said drive shaft 19. A double acting cylinder 21 connected to a slotted drive shaft at each end is used as a means to drive the ribs 29 and 7, of the left and right brake shoes toward peripheral surface 5. A plurality of spring devices 13 are used to keep left shoe plate and right shoe plate away from said annular friction surface 10 when contact with said annular friction surface is not required. A wall 2 is used to support said single hydraulic 58 with rivets or other well known common nuts and bolts; a left brake shoe 125 as a means to drive said peripheral friction pad 4 toward said peripheral friction surface 5; said left brake shoe comprising peripheral plate 6, a friction pad 4, and a rib 7.

Peripheral friction shoe pad 4 bonded to plate 6; annular friction plate 9; annular friction plate pad 8 bonded to plate 9; double acting hydraulic cylinder 21, and two slotted shafts 20; sliced bolt 26, sloped wedge 14, lock nuts 27, lock nut 18, and lock nut 17 are eleminated for this embodiment. Single acting hydraulic cylender 25, and a drive shaft 19 to force the said annular supplemental friction plate 23 and friction pad 24 on toward said annular friction surface 10 in a direct drive are used to construct this combination drum and disc brake embodiment. Spring device 13 is used to keep left shoe plate 125 and right shoe plate and right shoe plate 150 away from said annular friction surface 10 when contact with said annular friction surface is not required.

A force fitted washer 75 is added to said shaft 19 so greater stability is provided.

Figure 4:
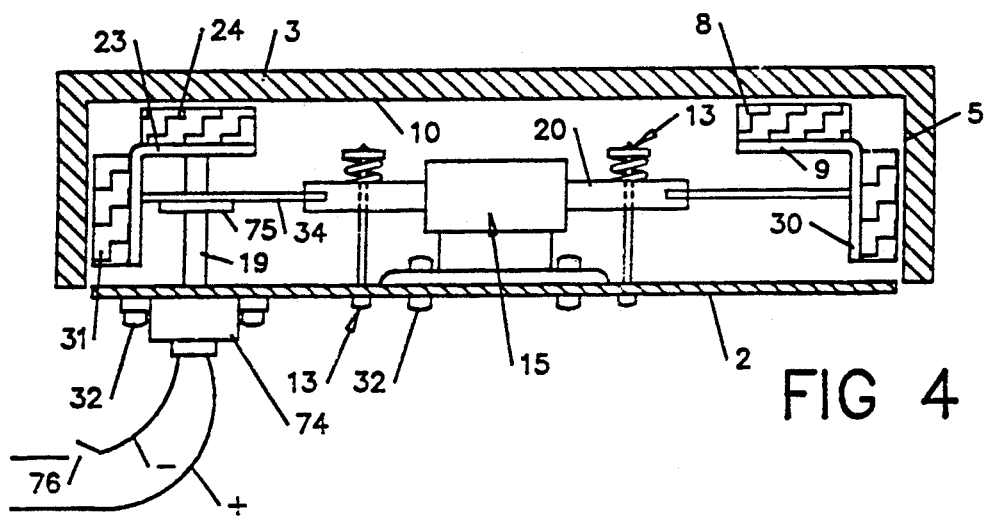
FIG. 4 illustrates a preferred embodiment of this invention as it might be applied to an emergency brake system for a motor vehicle or trailer.

Refering now to FIG. 2 and FIG. 4 which are an over-all drawing of yet another embodiment shown with different views of this invention applied to an emergency and parking brake system. FIG. 2 shows a typical prior art parking brake system wherein a brake cable 72(see FIG. 2) attached to shoe rib 29 with a cable holding flap 73. When the parking brake hand or foot lever is asserted, the cable pulls the right brake shoe 150 which causes the left brake shoe 125 to press against the inner peripheral friction surface 5 to develop the friction force needed by the vehicle in a parked mode. There are many different prior art cable, drum parking brake systems available and used in motor vehicles and trailers and any of them acting in conjunction with an annular disc surface 10, annular friction plate 23, annular plate friction plate pad 24, solenoid drive shaft 19, brake drum 3 and solenoid 74 is a means of creating an embodiment of this combination drum and disc brake invention.

FIG. 4 shows a view of the annular components needed to work with the prior art drum types of parking brake systems to construct an an embodiment of this invention. When switch 76 is closed by a lever interacting with brake cable 72, the power is delivered to solenoid 74 from any nearby set of electrical lines with the potential difference required by solenoid 74. Most motor vehicles operate at 12 volts. The solenoid drive shaft 19 forces said annular plate 23 and said pad 24 to said annular surface 10 and consequently the additive braking effect is achieved by this invention. The braking effect of the cable depends on how taut the tension in the cable is made. In the parking mode it is generally adequate unless the cable becomes frozen in its housing or it is broken or loose. However when the vehicle is in motion it takes a great amount of cable tension to stop the vehicle and it is rather slow. But with this invention, the stopping time can be significantly reduced and also serve to give a measure of added safety if the brake cable becomes defective.

Figure 5:
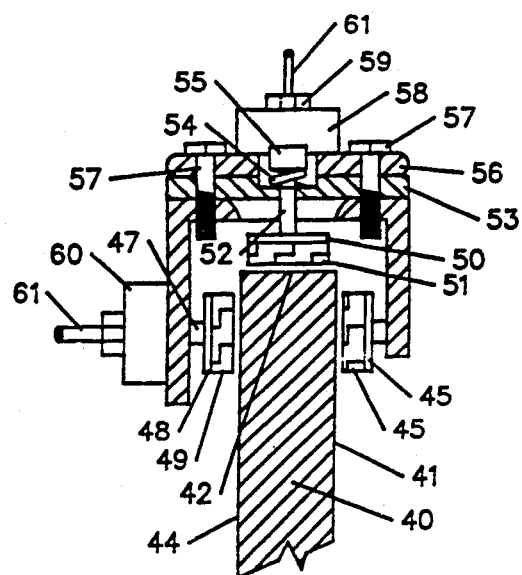
FIG. 5 illustrates a typical prior art disc brake system modified to provide the essential components of this invention.

Refer now to FIG. 5 which is an over-all drawing of another preferred embodiment of this invention wherein a typical prior art disc brake system is modified by the application of this invention, making it a combination drum and disc brake system. The added friction force produced when friction pad 51 rubs against the peripheral friction surface 42, is additive to the prior art friction forces produced by the caliper 47 squeezing effect that produces a braking friction force on the annular friction surface 41 and annular friction surface 44. The added friction force is dependent upon the force delivered by single acting hydraulic cylinder 58 through shaft 52. Said combined annular and peripheral friction surfaces are aligned at an angle to each other in different planes; the said two annular friction surfaces are parallel and the angle at which the said peripheral friction surface forms with each of the said annular friction surfaces is 90 degrees for this embodiment; said annular and peripheral surfaces are in different planes on a physical medium disc 40 as a single unit to rotate with a common axle or a common axis to control the motion of a motor vehicle or trailer or other devices requiring a braking effect; summarily this embodiment comprises a brake disc 40 as a medium to contain said combined annular and peripheral friction surfaces, two annular friction surfaces(41 and 44)comprising an annular friction surface on each side in said brake disc 40; a peripheral friction surface 42 in said brake disc, a peripheral friction plate 50, two annular friction plates(45 and 48), a friction plate pad bonded to each said annular friction plates, a peripheral friction pad 51 bonded to said peripheral friction plate 50. A means to drive each said annular friction plate and said peripheral friction surface respectively; a friction plate pad 51 bonded to said annular friction plate 50; a caliper device powered by at least one single acting hydraulic cylinder 60 as a means to drive said annular friction pad 51 toward said annular friction surfaces 41 and 44; a peripheral friction pad 51 bonded to said peripheral plate 50; a conversion plate 53 with an opening to allow access to the said peripheral surface 50; a single acting peripheral hydraulic cylinder 58 to be used as a means to force the said peripheral friction pad 51 via a drive shaft 52 and said peripheral friction plate toward the said peripheral friction surface 42; a spring 54 to force said peripheral friction pad 51 away from said peripheral surface 42 when the peripheral braking effect is not required; and a plurality of bolts 57 appropriately screwd into the housing of the caliper device to hold said conversion plate and said peripheral cylinder; the cylinder holding flange 56 is part of hydraulic cylinder 58.

The foregoing descriptions of the preferred embodiments of this invention have been presented for the purposes of illustration and description. They are not intended to be exaustive or to limit the invention to the precise form disclosed. Many variations are possible in light of the above teaching. It is intended that the scope of the invention be limited not by these detailed descriptions, but rather by the claims appended hereto.

I claim:

1. A brake apparatus including two friction surfaces in different planes that are not parallel to each other, aligned at an angle to each other on a physical medium as a single unit, so that said surfaces when forced to press against other respective surfaces with speeds that differ from those of said two friction surfaces, will produce frictional forces to control motion of a motor vehicle or trailer comprising: a housing; a brake shoe means having circumferential friction plate fixed to an annular side friction plate by a brake shoe rib;

a brake drum with an inner circumferential surface and an annular side friction surface;

a sloped wedge attached to said housing;

a bolt connected to said brake shoe rib, said bolt having a sloped surface matching and confronting the sloped wedge; and a means to drive said brake shoe means so that the circumferential friction plate presses against the inner circumferential surface and, via reaction of the friction sloped surface of the bolt sliding upon the sloped wedge, the annular side friction plate presses against the side annular friction surface of the brake drum.

* * * * *